United States Patent [19]
Andres

[11] Patent Number: 5,571,244
[45] Date of Patent: Nov. 5, 1996

[54] AIR BEARING ROTARY ENGINE

[75] Inventor: David C. Andres, 2020 3rd St., Berkeley, Calif. 94710

[73] Assignees: David C. Andres; Robert W. Burnett; Kathleen C. Barry, all of Berkeley, Calif.

[21] Appl. No.: 613,358

[22] Filed: Mar. 11, 1996

Related U.S. Application Data

[62] Division of Ser. No. 366,825, Dec. 30, 1994, Pat. No. 5,509,388.

[51] Int. Cl.$^6$ ..................... F02B 53/00
[52] U.S. Cl. ............... 123/231; 418/92; 418/152
[58] Field of Search ............... 123/231; 418/92, 418/151, 178, 234, 152

[56] References Cited

U.S. PATENT DOCUMENTS

| | | | |
|---|---|---|---|
| 29,473 | 8/1860 | Donovan | 418/151 |
| 1,261,938 | 4/1918 | Johanson | 123/231 |
| 1,922,363 | 8/1933 | Hapkins | 123/243 |
| 2,179,401 | 11/1939 | Chkliar | 123/231 |
| 2,468,451 | 4/1949 | Kutzner | 123/231 |
| 2,827,025 | 3/1958 | Puim | 123/231 |
| 3,103,920 | 9/1963 | Georges | 418/92 |
| 3,227,145 | 1/1966 | Bernard | 123/231 |
| 3,782,107 | 1/1974 | Bendall | 123/231 |
| 3,872,840 | 3/1975 | Adragna . | |
| 3,886,908 | 6/1975 | Ruzic . | |
| 3,902,465 | 9/1975 | Stookey . | |
| 3,909,013 | 9/1975 | Kumar | 418/115 |
| 4,401,070 | 8/1983 | McCann | 123/229 |
| 4,548,560 | 10/1985 | Kanao | 123/231 |
| 5,072,705 | 12/1991 | Overman | 123/231 |

FOREIGN PATENT DOCUMENTS

| | | | |
|---|---|---|---|
| 1028015 | 2/1953 | France | 123/231 |
| 2411321 | 8/1979 | France | 418/115 |
| 612784 | 5/1935 | Germany | 123/231 |
| 1503590 | 7/1969 | Germany | 418/92 |
| 3642359 | 6/1988 | Germany | 123/243 |
| 0004912 | 1/1977 | Japan | 123/243 |
| 0119027 | 10/1984 | Japan | 123/231 |
| 62-210275 | 9/1987 | Japan | 418/152 |

*Primary Examiner*—Michael Koczo
*Attorney, Agent, or Firm*—Francis Luca Conte

[57] ABSTRACT

A rotary engine includes a cylindrical rotor having four spaced apart vanes therein mounted in a stator housing having an oblong perimeter casing which defines generally crescent shaped, diametrically opposite first and second working chambers in which the rotor vanes travel. Inlet and outlet ports are disposed at respective ends of the working chambers, and a flow chamber is joined to the casing between the working chambers. The vanes have tip apertures supplied with pressurized fluid to provide bearings with the casing.

20 Claims, 7 Drawing Sheets

AIR BEARING ROTARY ENGINE

This is a division of U.S. patent application Ser. No. 08/366,825, filed Dec. 30, 1994, now U.S. Pat. No. 5,509,388.

The present invention relates generally to internal combustion engines, and, more specifically, to a rotary engine.

BACKGROUND OF THE INVENTION

Various configurations of internal combustion rotary engines are known and have varying degrees of complexity. Rotary engines typically use a solid, usually triangular, rotor, or a rotor having vanes therein. The rotor rotates either coaxially in a cooperating casing, or may be mounted eccentrically therein with varying-volume working zones for intake, compression, expansion, and exhaust being defined by variously configured chambers between the perimeter of the rotor and the inner surface of the casing.

Efficiency and maximum operating speed of these engines are limited by the various configurations thereof due to vibration, lubrication, and cooling considerations for example.

SUMMARY OF THE INVENTION

A rotary engine includes a cylindrical rotor having four spaced apart vanes therein mounted in a stator housing having an oblong perimeter casing which defines generally crescent shaped, diametrically opposite first and second working chambers in which the rotor vanes travel. Inlet and outlet ports are disposed at respective ends of the working chambers. The vanes have tip apertures supplied with pressurized fluid to provide bearings with the casing.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
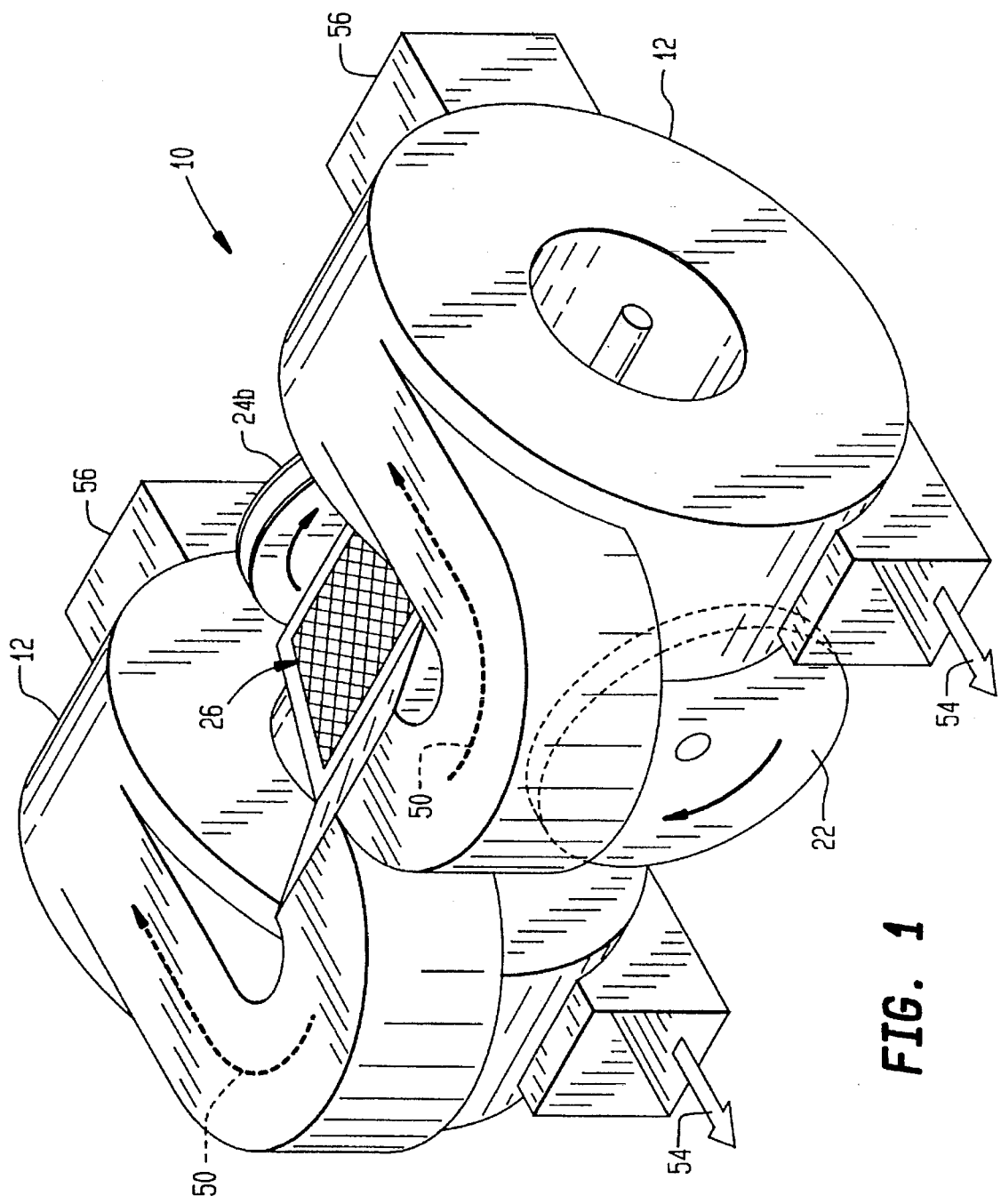
FIG. 1 is a perspective back view of an exemplary two rotor internal combustion rotary engine in accordance with one embodiment of the present invention.
Figure 2:
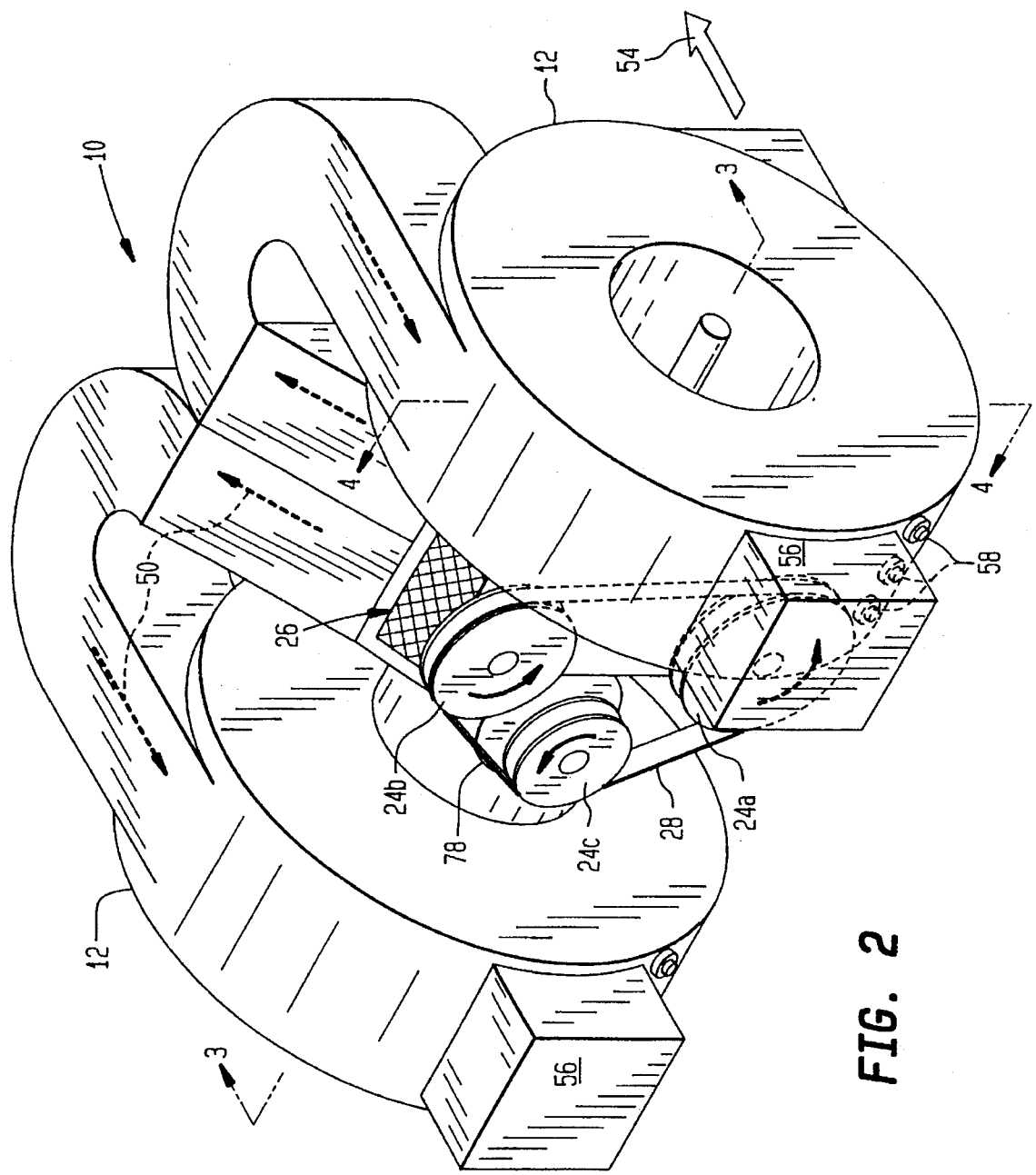
FIG. 2 is a perspective front view of the rotary engine illustrated in FIG. 1.
Figure 3:
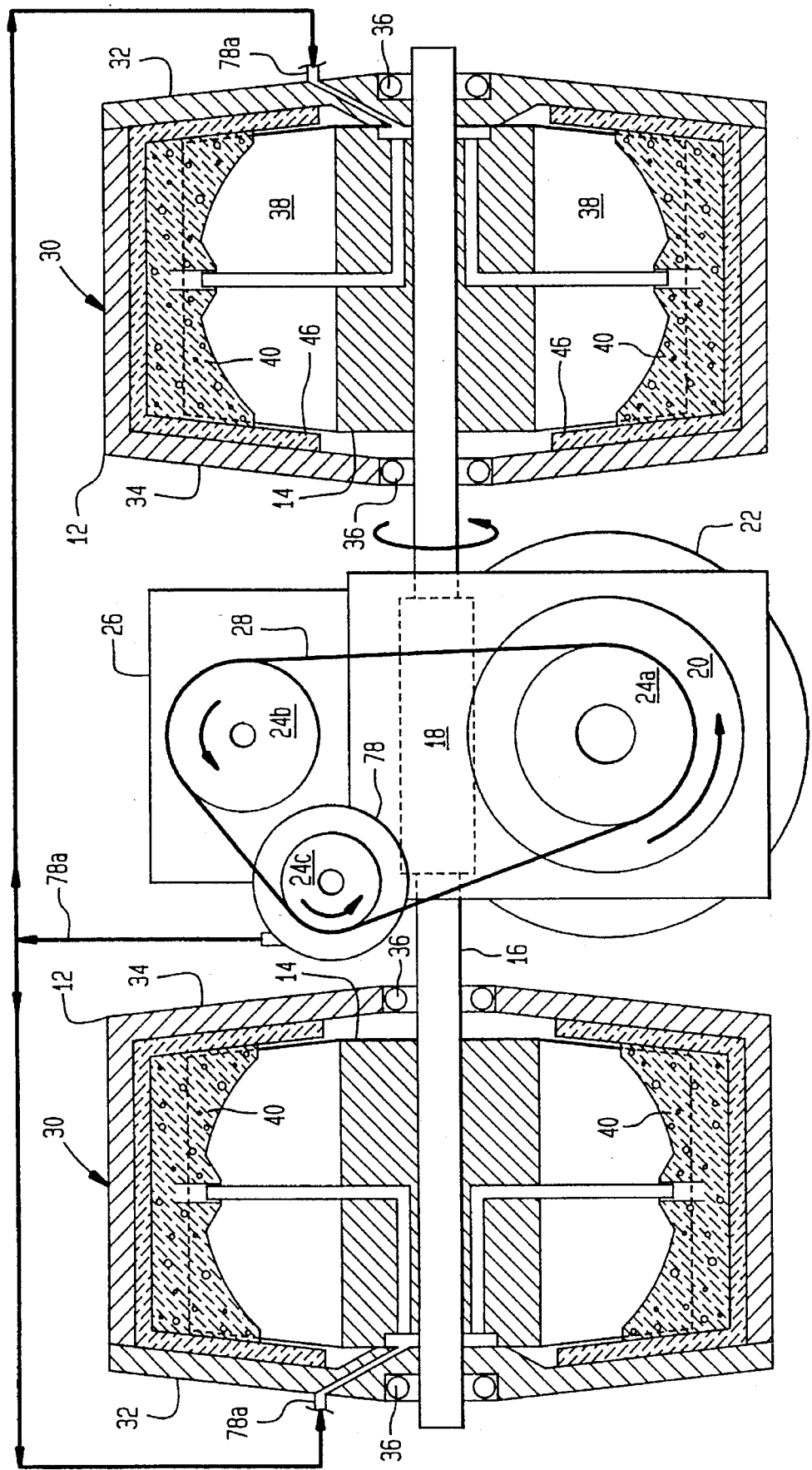
FIG. 3 is a transverse sectional view through the rotary engine illustrated in FIG. 2 and taken generally along line 3—3 and illustrates a pair of rotors with respective vanes thereon disposed in housings.

Illustrated schematically in FIGS. 1 and 2 is an exemplary two-rotor rotary engine 10 in accordance with one embodiment of the invention. The engine 10 includes a pair of stationary stator housings 12 in which are disposed identical cylindrical rotors 14 as illustrated in FIG. 3. A common drive shaft 16 is fixedly joined to the two rotors 14 and includes a suitable gear arrangement for extracting power from the rotors 14. In the exemplary embodiment illustrated in FIG. 3, a worm gear 18 is operatively joined to a bullgear 20 in an exemplary 6:1 reduction ratio for rotating the drive shaft 16 upon rotation of the rotors 14. As shown in FIGS. 1 and 2 a flywheel 22 is suitably coaxially joined to the bullgear 20 for providing power, for example, to a transmission (not shown) for powering a vehicle.

As shown in FIGS. 2 and 3, suitable pulleys 24a,b,c may also be provided for powering a conventional supercharger 26, and accessory components such as an alternator (not shown), through a suitable chain or fan belt 28 with one of the pulleys 24a being coaxially joined with the bullgear 20 and another pulley 24b being suitably joined to the supercharger 26. The supercharger 26 has a suitable inlet and air filter as required for receiving air which is then compressed within the supercharger 26 and later used in the engine 10. Since both halves of the rotary engine 10 illustrated in FIGS. 1–3 are identical to each other in the preferred embodiment, the following description of one side is applicable to both sides.

Figure 4:
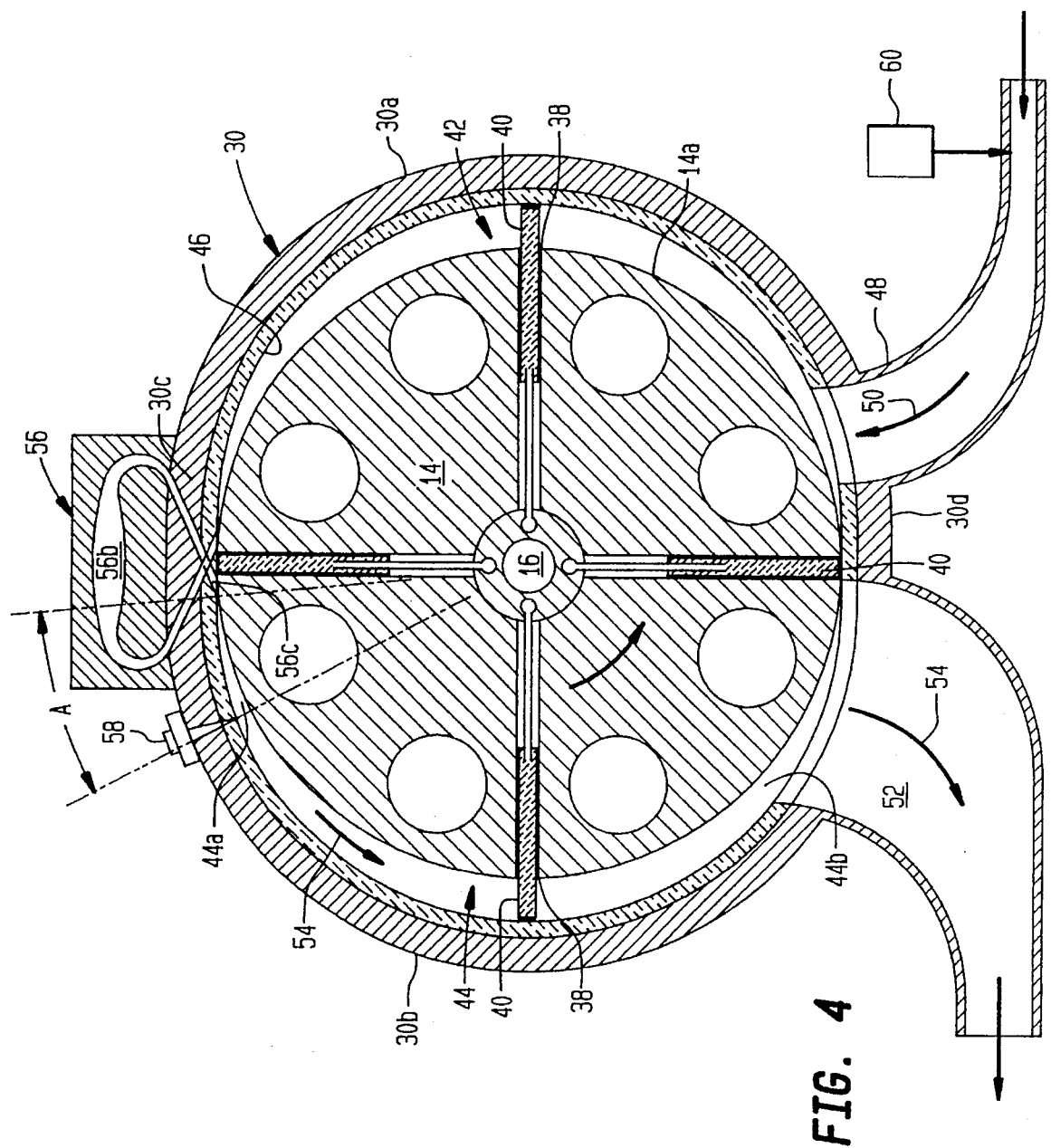
FIG. 4 is an axial sectional view through one of the rotors of the rotary engine illustrated in FIG. 2 and taken generally along line 4—4 and illustrates a flow chamber between first and second working chambers of the engine.

More specifically, and referring to FIGS. 3 and 4, the stator housing 12 has an annular perimeter wall or casing 30, and first and second annular sidewalls 32 and 34 (see FIG. 3) integrally joined thereto. The stator housing 12 is preferably formed of two parts, with the first sidewall 32 being one part, and the second sidewall 34 and casing 30 being the second part, both suitably joined together. The rotor 14 is disposed in the housing 12 between the first and second sidewalls 32, 34, with the drive shaft 16 being suitably fixedly joined to the center of the rotor 14 and being coaxially rotatably mounted to the first and second sidewalls 32, 34 by suitable sealed roller or ball bearings 36. The rotor 14 is preferably formed of a suitable lightweight material such as titanium and may have suitable holes therein as shown in FIG. 4 for reducing unnecessary weight thereof. The housing 12 is preferably a heat conductive structure such as aluminum.

As shown in FIG. 4, the rotor 14 preferably has four slots 38 extending radially inwardly from a circular perimeter 14a thereof, and are equiangularly spaced apart from each other at 90°. Four planar vanes 40 are slidably mounted in respective ones of the rotor slots 38 as disclosed in more detail hereinbelow. The vanes 40 are preferably made of commercially available reticulated ceramic foam, such as Duocel ceramic foam by Energy Research Generation, Inc. (ERG), Materials Division, Oakland, Calif. The interior of the vanes 40 is porous with an open cell structure, with the exterior of the vanes 40 being an integral non-porous solid ceramic shell.

As shown in FIG. 4, the perimeter casing 30 is preferably oblong in transverse configuration and includes first and second, diametrically opposite arcuate portions 30a and 30b, and first and second diametrically opposite flat portions 30c and 30d disposed therebetween. The arcuate portions 30a,b are preferably portions of a circle each having the same, single radius which is preferably equal to the radius of the rotor perimeter 14a. The arcuate portions 30a,b are spaced radially further from the rotor perimeter 14a than the flat portions 30c,d to define generally crescent shaped, diametrically opposite first and second working chambers 42 and 44 in which the rotor vanes 40 travel. As shown in FIG. 4, when the vanes 40 are at 12 and 6 o'clock, they form a relatively tight seal with little clearance with a liner 46 which is disposed along an inner surface of the casing 30. The vanes 40 at the 3 and 9 o'clock positions have their maximum radial extension from the rotor 14 and are also disposed in sealing relationship with the liner 46. The casing 30 is symmetrically oblong, with the cylindrical rotor 14 being disposed symmetrically therein so that during rotation of the rotor 14 in operation, radial extensions of circumferentially opposite vanes 40 are substantially equal to each other for providing inherent balancing.

Referring again to FIG. 4, an inlet port 48 is disposed through the casing 30 adjacent to an upstream end of the first chamber 42 at the casing second flat portion 30d for receiving a compressible fluid 50 for being compressed in the first chamber 42 as the rotor 14 rotates in the casing 30 during operation. An exhaust port 52 is disposed through the casing 30 adjacent a downstream end of the second working chamber 44 at the casing second flat portion 30d for discharging combustion gases 54 therefrom.

As shown in FIG. 4, the rotor 14 rotates counterclockwise and the terms upstream and downstream as used above refer to the general flowpath of fluid flow from the inlet port 48 at the bottom of the first chamber 42 which flows counterclockwise therearound and into the top of the second chamber 44 and again counterclockwise therethrough for discharge from the outlet port 52.

In accordance with a preferred feature of the present invention, a stationary flow chamber 56 is fixedly joined to the casing 30 symmetrically at the first flat portion 30c thereof, which is at the 12 o'clock position on the casing 30. The flow chamber 56 is preferably made of solid aluminum. The flow chamber 56 is relatively simple in structure and is effective for regulating flow between the first and second chambers 42,44.

Figure 5:
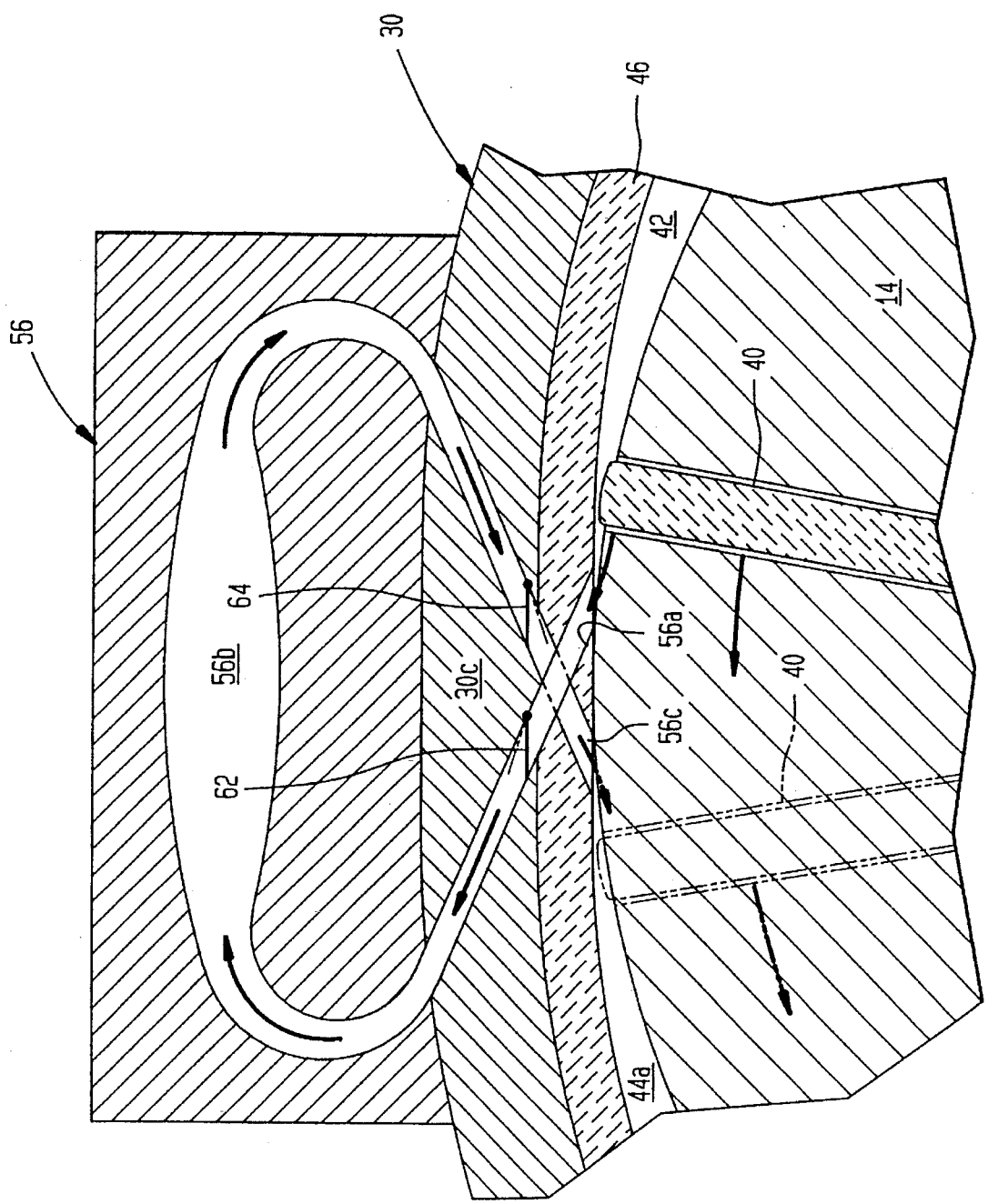
FIG. 5 is an enlarged sectional view of the flow chamber illustrated in FIG. 4.

The flow chamber 56 is illustrated in more particularity in FIG. 5 and includes an inlet passage 56a disposed in flow communication with the downstream end of the first working chamber 42 for receiving the fluid 50 which is compressed in the first working chamber 42. Following in turn the inlet passage 56a is a central storage passage 56b for temporarily storing the compressed fluid 50. And extending in turn from the storage passage 56b is an outlet passage 56c disposed in flow communication with the upstream end of the second working chamber 44 for discharging thereto the compressed fluid stored in the storage passage 56b.

As shown in FIG. 4, at least one, and preferably three (see also FIG. 2) conventional spark plugs 58 are disposed in the casing 30 adjacent to the upstream end of the second working chamber 44 and downstream from the flow chamber 56, and are predeterminedly angularly spaced from the flow chamber outlet passage 56c at an acute angle A for defining a combustion zone 44a at the upstream end of the second working chamber 44 in which combustion is initiated by ignition from the spark plugs 58. The spark plugs 58 are preferably continuous duty, and therefore require no timing apparatus.

During operation, the compressible fluid or air 50 is channeled into the casing 30 through the inlet port 48 and may either be at ambient air pressure, or may be initially compressed by the supercharger 26 illustrated in the exemplary embodiment of FIGS. 1 and 2. Also in the preferred embodiment illustrated schematically in FIG. 4, conventional fuel injecting means 60, such as one or more fuel injectors, is provided for injecting fuel into the compressible fluid 50 at the inlet port 48 for providing a combustible fluid mixture into the first chamber 42 and in turn into the flow chamber 56 for ignition in the combustion zone 44a by the spark plugs 58. Although the fuel may be gasoline, in the preferred embodiment the fuel is gaseous such as natural gas, propane, butane or hydrogen so that switching from one fuel to another will only require mixture adjustments between the fuel and the compressible fluid or air 50.

As the rotor 14 rotates counterclockwise during operation as shown in FIG. 4, the compressible fluid 50 which now includes fuel mixed therein is drawn into the first working chamber 42 and is then compressed therein as the vanes 40 rotate counterclockwise and the volume of the first chamber 42 progressively decreases toward the 12 o'clock position. Since the clearances between both the vanes 40 and rotor perimeter 14a relative to the casing liner 46 at the 12 o'clock position are relatively small for ensuring that the first and second working chambers 42, 44 are separate and distinct and substantially closed volumes, the compressed fluid is temporarily bypassed from inside the casing 30 into the flow chamber 56 wherein it is temporarily stored and rerouted into the second working chamber 44 just prior to the combustion cycle.

Since the constantly energized spark plugs 58 begin combustion within the combustion zone 44a, the angular location A between the flow chamber outlet passage 56c and the spark plugs 58 determines the volume of fluid which undergoes combustion and thereby increases substantially in pressure for driving the vanes 40, and in turn the rotor 14 counterclockwise. As the combustion gases 54 flow counterclockwise in the second chamber 44 they expand due to the progressively increasing volume of the second chamber 44 for extracting maximum energy therefrom. The exhaust port 52 is preferably located at the downstream end of the expansion cycle within the second working chamber 44 and defines an exhaust zone 44b from which the combustion gases 54 exit the casing 30 through the exhaust port 52.

Since the pressure of the combustion gases 54 within the combustion zone 44a is substantially higher than the compression pressure of the compressed fluid 50 in the first chamber 42, the flow chamber 56 as illustrated in more particularity in FIG. 5 preferably includes suitable means for allowing primarily one-way flow through the flow chamber 56 from the first working chamber 42 to the second working chamber 44 which will substantially prevent backflow of the combustion gases 54 therethrough. As shown in FIG. 5, the one-way flow means preferably include a conventional one-way first valve 62 such as a hinged flapper valve illustrated as being disposed in the inlet passage 56a at a suitable location therein for allowing primarily only one-way fluid flow into the storage passage 56b from the inlet passage 56a. A second one-way valve 64 which is preferably identical to the first valve 62 is suitably disposed in the outlet passage 56c for allowing primarily only one-way fluid flow out of the storage passage 56b and into the second working chamber 44. The second valve 64 may be suitably spring loaded or biased closed to regulate the pressure of the combustible mixture in the flow chamber 56.

Both the first and second valves 62, 64 are self operating by differential pressure from flow of the fluid therethrough during operation. As the compressed fluid 50 reaches the inlet passage 56a during operation, it is at its maximum compression pressure which biases the first valve 62 open as shown in phantom line in FIG. 5, with the compressed fluid 50 being channeled into the storage passage 56b. Combustion in the combustion zone 44a during the previous cycle biases the second valve 64 in its closed position preventing backflow of the combustion gases 54 therepast while also preventing forward flow of the compressed fluid in the storage passage 56b. When the combustion gases 54 have expanded suitably within the second working chamber 44 the pressure thereof decreases which allows the second valve 64 to open due to the greater pressure of the stored compressed fluid 50 within the storage passage 56b which also keeps the first valve 62 closed, with the compressed fluid 50 then leaving the flow chamber 56 through the outlet passage 56c and filling the combustion zone 44a again for the next cycle. The cycles are repeated as the rotor 14 rotates counterclockwise with a suitable steady state pressure being achieved within the flow chamber 56, with the pressure therein pulsating as each cycle provides fresh compressed fluid from the first chamber 42 into the flow chamber 56, which in turn is channeled into the second working chamber 44 wherein it is ignited in the combustion zone 44a.

In order to reduce frictional pressure losses and pressure heating, the inlet and outlet passages 56a,c of the flow chamber 56 preferably cross each other as shown in FIG. 5 with the inlet passage 56a being inclined forwardly in the direction of travel of the vanes 40, and the outlet passage 56b being inclined rearwardly relative to the vane travel direction and opposite to the inclination of the inlet passage 56a. Along with the storage portion 56b, the inlet and outlet passage 56a and 56c resemble the upper portion of a figure "8".

Figure 6:
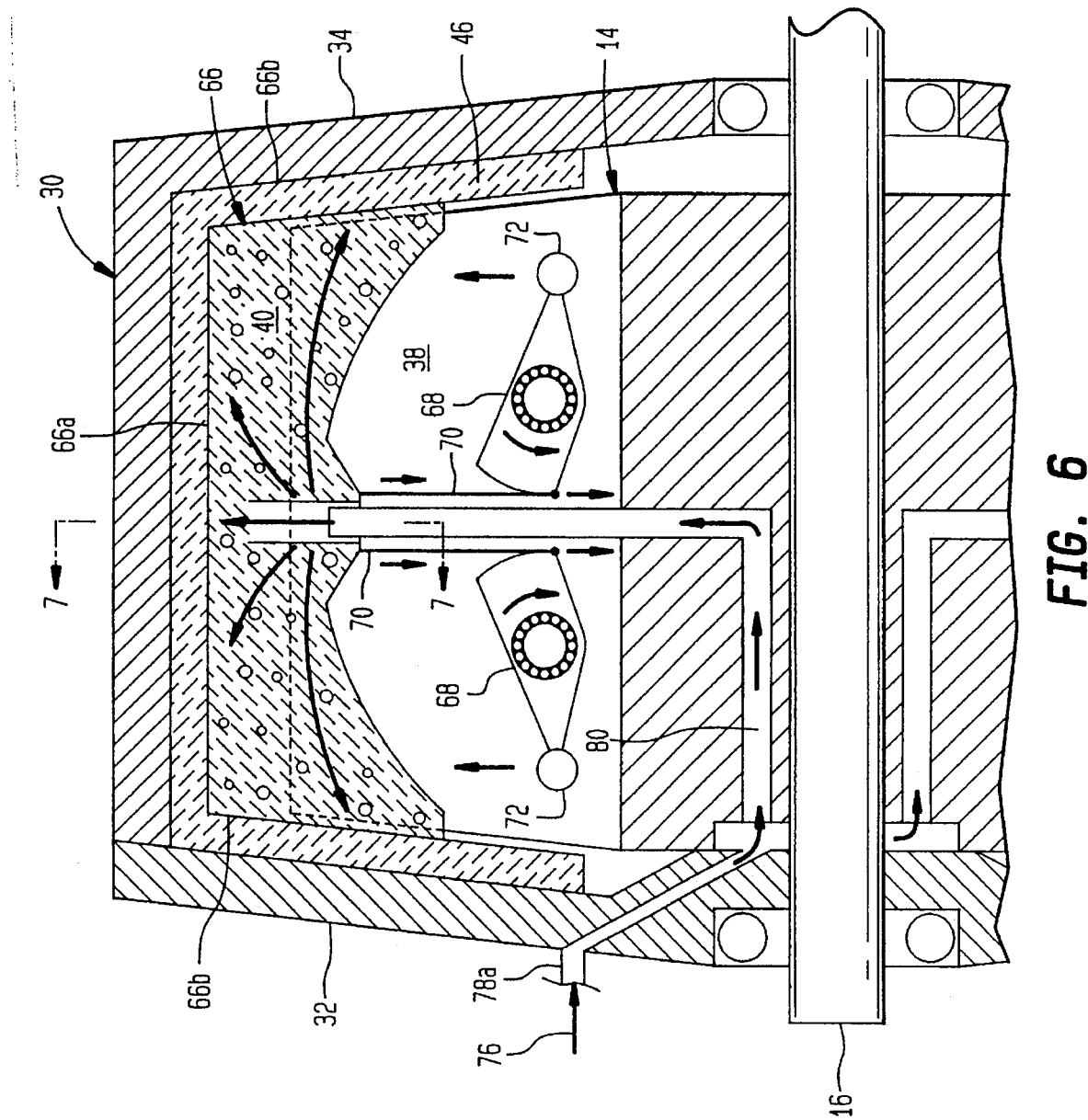
FIG. 6 is an enlarged, partly sectional view of the rotor and one of its vanes as illustrated in FIG. 2.

Illustrated in FIG. 6 are exemplary means disposed in the rotor 14 for counterbalancing centrifugal force on the vanes 40 during rotation of the rotor 14. Since the vanes 40 are merely slidably disposed in the rotor slots 38, they are allowed to freely slide radially inwardly and outwardly therein for following the contour of the casing 30 as the rotor 14 rotates therein. The rotor slots 38 preferably extend axially completely through the rotor 14 to about the first and second sidewalls 32, 34 of the housing 12 which are oppositely inclined closer together in the radially outward direction as shown in FIG. 6. Correspondingly, the vanes 40 are preferably generally trapezoidal in shape with a correspondingly shaped vane tip 66 which includes a horizontal radially outer portion 66a and opposite axial side portions 66b extending axially outwardly from the rotor slots 38 for providing a seal with the liner 46 of the casing 30 on three sides.

Accordingly, as the rotor 14 rotates during operation, centrifugal force urges the vanes 40 radially outwardly toward the corresponding surfaces of the liner 46 inside the casing 30 and along the radially outer portions of the first and second sidewalls 32, 34. Circumferentially adjacent vanes 40, the casing 30, and the rotor perimeter 14a together define a substantially closed volume which rotates and changes magnitude as the vanes 40 slide in and out of their slots 38.

Since centrifugal force on the vanes 40 can have substantial magnitude especially when operating the rotor 14 at relatively high speeds, the counterbalancing means illustrated in FIG. 6 provide a radially inwardly directed force on the vanes 40 opposite to the direction of centrifugal force. More specifically, counterbalancing is provided for each of the vanes 40 by a beam or link 68 having opposite first and second ends, and an intermediate section pivotally joined to the rotor 14 by a suitable roller bearing disposed in a respective one of the rotor slots 38. The link first end is preferably joined to an inner end of the vane 40 by a flexible strap 70 which may be a suitable metal such as stainless steel or a suitable composite including Kevlar brand structural fiber. The strap 70 is fixedly joined at opposite ends thereof to the inner end of the vane 40 and the link first end. A suitably sized counterweight 72 is fixedly joined to the link second end and has a suitable mass preselected to counterbalance centrifugal force on the vanes 40.

In the preferred embodiment illustrated in FIG. 6, the counterbalancing means comprise respective pairs of the links 68, straps 70, and counterweights 72 joined to each of the vanes 40, with each of the counterweights 72 providing half of the counterbalancing force. As the rotor 14 rotates during operation, and the vanes 40 slide radially outwardly and inwardly in the respective slots 38, the counterweight 72 provides centrifugal force which tends to pull radially inwardly the vanes 40 through the straps 70, with the straps 70 translating radially while the links 68 oscillate about the link center bearing as the vanes 40 travel up and down.

In order to reduce or eliminate the need for liquid or oil lubrication between the vanes 40 and the liner 46, the liner 46 is preferably made of a suitable ceramic such as silicon carbide for cooperating with the ceramic vane tips 66. The ceramic liner 46 provides heat insulation for improving efficiency of the engine, as well as improving wear resistance with the vanes 40.

Furthermore, it is desirable to provide an air bearing between the vane tip 66 and the liner 46 for reducing contact therebetween during operation while maintaining effective sealing thereat. More specifically, and referring to FIGS. 6 and 7, the interior of the vanes 40 is preferably porous with an open cell structure, and a plurality of apertures 74 extend through the solid exterior shell at the vane tip 66, and the vanes 40 are suitably provided with a pressurized fluid such as air 76 through the interiors thereof which flows out the tip apertures 74 for providing the fluid bearing between the vane 40 and the liner 46 of the casing 30. As shown in FIG. 3, a suitable air pump 78 may be used for supplying the pressurized air 76 to the vanes 40 through a supply conduit 78a. The air pump 78 may be conventionally driven by the pulley 24c cooperating with the pulley 24a for example.

Figure 7:
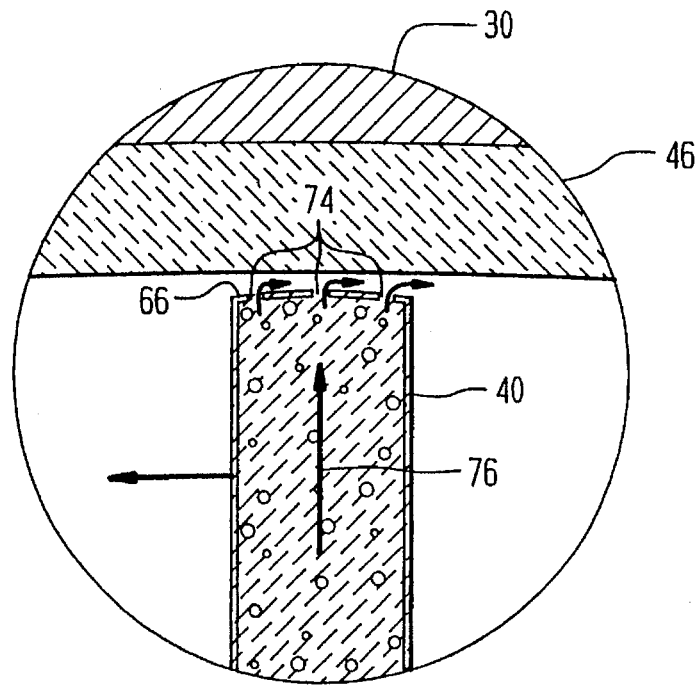
FIG. 7 is an enlarged sectional view of one embodiment of the tip region of the vane illustrated in FIG. 6 and taken along line 7—7.

As shown in FIG. 6, the supply conduit 78a extends through the housing first sidewall 32 adjacent to the drive shaft 16 and discharges the pressurized air 76 in a suitable cavity at the hub of the rotor 14. A suitable delivery conduit 80 extends through the rotor 14 from adjacent the supply conduit 78a from which it receives the pressurized air 76, which is carried through the conduit 80 radially upwardly into the vane 40. As shown in FIG. 7, the pressurized air 76 flows radially upwardly through the vane 40 and is discharged through the tip apertures 74 for creating the air bearing and seal in cooperation with the liner 46 of the casing 30. Since the vane tips 66 are not normal to the liner 46 in the short transition region between the 12 and 6 o'clock middle sections of the casing first and second flat portions 30c and 30d to the juncture of the first and second arcuate portions 30a and 30b (see FIG. 4), the embodiment of the vane tips 66 illustrated in FIG. 7 are arcuate in section for maintaining a substantially uniform gap between the tips 66 and the liner 46 of the casing 30 during travel thereof as the rotor 14 rotates. In this embodiment, a plurality, three for example, of rows of the tip apertures 74 are provided between the sides of the vanes 40.

Figure 8:
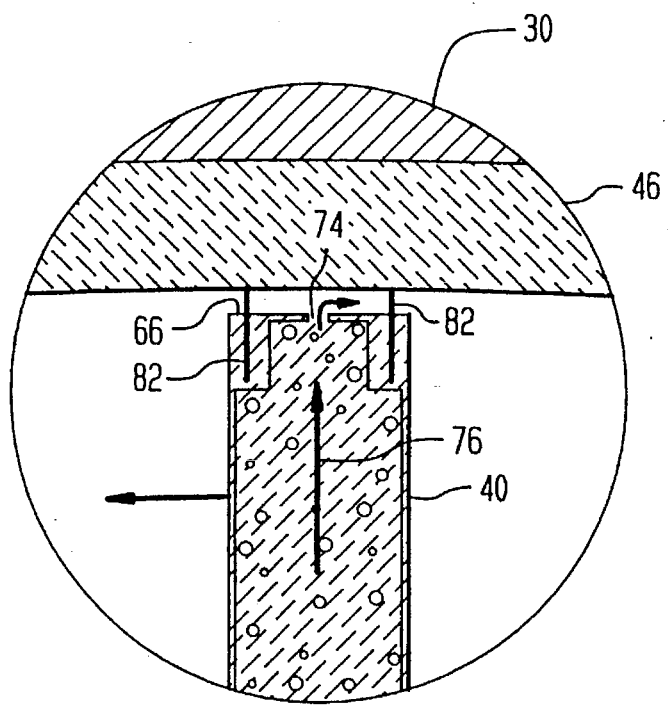
FIG. 8 is an alternate embodiment of the tip region of the vane illustrated in FIG. 6 and taken along line 7—7.

FIG. 8 illustrates an alternate embodiment of the vane tips 66 which is generally rectangular in section and has a larger gap with the liner 46. In this embodiment, a pair of spaced squealer tips or seals 82 extend radially outwardly from the vane tip 66 for contacting the liner 46 of the casing 30 for providing an effective seal thereat. The tip apertures 74 are disposed between the squealer tips 82 for discharging the pressurized fluid therebetween.

The rotary engine 10 described above is relatively simple in configuration and has relatively high speed capability with minimal vibration. In one embodiment, the rotor 14 may be operated up to about 30,000 rpm at which speed, the speed of sound is reached at the tips of the vanes 40 at the 3 and 9 o'clock positions wherein they have their greatest radial extent and therefore velocity. The flow chamber 56 provides an effective means to transfer the compressed fluid from the first working chamber 42 after compression thereof and into the second working chamber 44 for undergoing combustion while at all times maintaining effective separation between the two working chambers. The vanes 40 are effectively counterbalanced during operation for reducing wear of the components while maintaining effective seals at the vane tips 66. By using suitable ceramics for the liner 46 and the vane tips 66, and providing air bearings therebetween, the need for petroleum based lubrication oils is reduced or eliminated. And, providing the air bearing at the vane tips 66 further reduces friction and wear while maintaining an effective seal thereat for obtaining improved efficiency of the engine 10 with an enhanced useful lifetime. The engine 10 may be simply air cooled by using suitable cooling fins (not shown) around the housing 12, or may include a suitable water jacket (not shown) for conventional water cooling thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A rotary engine comprising:

a stator housing having a perimeter casing and first and second annular sidewalls joined thereto;

a cylindrical rotor disposed in said housing between said first and second sidewalls and having a coaxial drive shaft fixedly joined to a center of said rotor and rotatably mounted to said first and second sidewalls, said rotor having four slots extending radially inwardly from a perimeter thereof and equiangularly spaced from each other;

four planar vanes slidably mounted in respective ones of said rotor slots, and each of said vanes including a tip having apertures;

said perimeter casing being oblong and having first and second diametrically arcuate portions and first and second diametrically opposite flat portions disposed therebetween, with said arcuate portions being spaced radially further from said rotor perimeter than said flat portions to define generally crescent shaped, diametrically opposite first and second working chambers in which said rotor vanes travel;

an inlet port disposed through said casing adjacent to an upstream end of said first chamber and said casing second flat portion for receiving a compressible fluid for being compressed in said first chamber as said rotor rotates in said casing;

an exhaust port disposed through said casing adjacent to a downstream end of said second chamber and said casing second flat portion for discharging combustion gases therefrom;

a pump for pressuring air;

means for channeling said pressurized air from said air pump through said vanes and out said tip apertures for providing an air bearing between said vanes and said casing; and a spark plug disposed in said casing adjacent to said upstream end of said second chamber for defining a combustion zone at said upstream end of said second chamber.

2. An engine according to claim 1 wherein said vane tips are arcuate in section for maintaining a substantially uniform gap between said tip and said casing during travel thereof as said rotor rotates.

3. An engine according to claim 2 wherein said vane tips include a pair of spaced apart squealer tips for contacting said casing, and said tip apertures are disposed between said squealer tips for discharging said pressurized fluid therebetween.

4. An engine according to claim 2 further comprising:

a flow chamber fixedly joined to said casing at said first flat portion thereof, and having in turn an inlet passage disposed in flow communication with a downstream end of said first chamber for receiving said compressed fluid therefrom, a central storage passage for temporarily storing said compressed fluid, and an outlet passage disposed in flow communication with an upstream end of said second chamber for discharging thereto said compressed fluid stored in said storage passage, said flow chamber further including means for allowing one-way flow through said flow chamber from said first chamber to said second chamber; and said inlet passage, storage passage, and outlet passage being configured in a crossing loop for changing flow direction of said compressed fluid from a forward direction in a direction of travel of said vanes to a rearward direction relative to said vane travel direction.

5. An engine according to claim 4 wherein said flow chamber inlet passage is inclined forwardly in said direction of travel of said vanes, and said flow chamber outlet passage is inclined rearwardly relative to said vane travel direction and opposite to said inclination of said inlet passage.

6. An engine according to claim 4 wherein said one-way flow means in said flow chamber comprises:

a one-way first valve disposed in said inlet passage for allowing primarily only one-way fluid flow into said storage passage; and a one-way second valve disposed in said outlet passage for allowing primarily only one-way fluid flow out said storage passage, both said first and second valves being operated by differential pressure from flow of said fluid therethrough during operation.

7. An engine according to claim 4 further comprising means for injecting fuel into said compressible fluid upstream of said inlet port for providing a combustible fluid mixture into said first chamber and in turn into said flow chamber for ignition in said combustion zone by said spark plug.

8. An engine according to claim 4 further comprising means disposed in said rotor for counterbalancing centrifugal force on said vanes during rotation of said rotor.

9. An engine according to claim 8 wherein said counterbalancing means comprise:

a link having opposite first and second ends and intermediate section pivotally joined to said rotor in a respective one of said rotor slots, said link first end being joined to said vane in said rotor slot for radial movement therewith; and a counterweight fixedly joined to said link second end and having a mass preselected to counterbalance centrifugal force on said vane.

10. An engine according to claim 9 wherein said counterbalancing means further comprise a flexible strap fixedly joined at opposite ends thereof to said vane and said link first end.

11. An engine according to claim 10 further comprising respective pairs of said links, counterweights, and straps joined to each of said vanes.

12. An engine according to claim 1 wherein said casing includes a liner along an inner surface thereof for providing heat insulation.

13. An engine according to claim 12 wherein said liner is ceramic and said vanes are ceramic.

14. An engine according to claim 1 wherein:

said rotor slots extend axially through said rotor;

said vanes are generally trapezoidal in shape with said vane tips having a radially outer portion, and opposite axial side portions extending axially outwardly from said rotor slots for providing a seal with said casing on three sides.

15. An engine according to claim 1 wherein said vanes are porous with an open cell structure for channeling said pressurized air therethrough.

16. An engine according to claim 15 wherein said vanes comprise a foam having a non-porous shell, with said tip apertures being disposed through said shell.

17. An engine according to claim 16 wherein said vanes and shell are ceramic.

18. An engine according to claim 1 further comprising:

a flow chamber fixedly joined to said casing at said first flat portion thereof, and having in turn an inlet passage disposed in flow communication with a downstream end of said first chamber for receiving said compressed fluid therefrom, a central storage passage for temporarily storing said compressed fluid, and an outlet passage disposed in flow communication with an upstream end of said second chamber for discharging thereto said compressed fluid stored in said storage passage, said flow chamber further including means for allowing one-way flow through said flow chamber from said first chamber to said second chamber;

said inlet passage, storage passage, and outlet passage being configured in a crossing loop for changing flow direction of said compressed fluid from a forward direction in a direction of travel of said vanes to a rearward direction relative to said vane travel direction; and means disposed in said rotor for counterbalancing centrifugal force on said vanes during rotation of said rotor.

19. An engine according to claim 18 wherein:

said flow chamber inlet passage is inclined forwardly in said direction of travel of said vanes, and said flow chamber outlet passage is inclined rearwardly relative to said vane travel direction and opposite to said inclination of said inlet passage;

said one-way flow means in said flow chamber comprises:

a one-way first valve disposed in said inlet passage for allowing primarily only one-way fluid flow into said storage passage; and a one-way second valve disposed in said outlet passage for allowing primarily only one-way fluid flow out said storage passage, both said first and second valves being operated by differential pressure from flow of said fluid therethrough during operation; and said counterbalancing means comprise:

a link having opposite first and second ends and an intermediate section pivotally joined to said rotor in a respective one of said rotor slots, said link first end being joined to said vane in said rotor slot for radial movement therewith; and a counterweight fixedly joined to said link second end and having a mass preselected to counterbalance centrifugal force on said vane.

20. An engine according to claim 19 wherein:

said casing includes a ceramic liner along an inner surface thereof for providing heat insulation; and said vanes comprise a ceramic porous foam with an open cell structure for channeling said pressurized air therethrough, with a ceramic non-porous shell having said tip apertures disposed therethrough.

* * * * *